US008024302B2

(12) United States Patent
Debique et al.

(10) Patent No.: US 8,024,302 B2
(45) Date of Patent: Sep. 20, 2011

(54) META DATA MANAGEMENT FOR MEDIA CONTENT OBJECTS

(75) Inventors: Kirt A. Debique, Seattle, WA (US); David E. Stewart, Kirkland, WA (US); Gabriel S. DeBacker, Carnation, WA (US); Nosakhare D. Omoigui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1370 days.

(21) Appl. No.: 10/979,993

(22) Filed: Nov. 3, 2004

(65) Prior Publication Data

US 2005/0091283 A1    Apr. 28, 2005

Related U.S. Application Data

(63) Continuation of application No. 09/820,088, filed on Mar. 27, 2001, now Pat. No. 7,191,190.

(51) Int. Cl.
G06F 7/00 (2006.01)
G06F 17/00 (2006.01)

(52) U.S. Cl. ........................................ 707/693; 707/805
(58) Field of Classification Search .......... 707/100–102, 707/104.1, 201, 693, 805
See application file for complete search history.

(56) References Cited

U.S. PATENT DOCUMENTS

| 5,464,946 A | 11/1995 | Lewis |
| 5,813,014 A | 9/1998 | Gustman |
| 5,832,496 A | 11/1998 | Anand et al. |
| 5,833,469 A | 11/1998 | Ito et al. |
| 5,845,104 A | 12/1998 | Rao |
| 5,880,388 A * | 3/1999 | Kajiyama et al. .............. 84/609 |
| 5,893,095 A | 4/1999 | Jain et al. |
| 5,925,843 A * | 7/1999 | Miller et al. .................... 84/609 |
| 6,061,680 A | 5/2000 | Scherf et al. |
| 6,061,682 A * | 5/2000 | Agrawal et al. ............... 707/694 |
| 6,118,450 A | 9/2000 | Proehl et al. |
| 6,272,081 B1 * | 8/2001 | Murata ....................... 369/47.15 |
| 6,330,593 B1 * | 12/2001 | Roberts et al. ................ 709/217 |
| 6,356,971 B1 | 3/2002 | Katz et al. |
| 6,380,947 B1 * | 4/2002 | Stead ............................ 345/645 |
| 6,388,957 B2 * | 5/2002 | Yankowski ................ 369/30.06 |
| 6,411,724 B1 | 6/2002 | Vaithilingam et al. |
| 6,429,364 B1 * | 8/2002 | Muraki et al. .................. 84/600 |
| 6,505,160 B1 * | 1/2003 | Levy et al. .................... 704/270 |
| 6,535,911 B1 * | 3/2003 | Miller et al. ................... 709/217 |
| 6,564,263 B1 | 5/2003 | Bergman et al. |

(Continued)

OTHER PUBLICATIONS

"Description of the Features in Microsoft Plus! 98," Microsoft Plus! 98, version 1.0, from http://support.microsoft.com/support/kb/articles/Q269/0/44.ASP, printed Mar. 7, 2001, 2 pages.

(Continued)

*Primary Examiner* — Yicun Wu
*Assistant Examiner* — Pavan Mamillapalli

(57) ABSTRACT

Meta data associated with multiple pieces of content (e.g., songs, movies, other audio/video clips, etc.) stored on multiple pieces of media (e.g., CDs, DVDs, etc.) is maintained in a meta data store. The meta data store also includes meta data associated with other pieces of content stored elsewhere, such as songs stored in files on a local hard drive that have been ripped from a CD or DVD. These other pieces of content are associated with the content on the pieces of media, such as being ripped versions of the same song tracks. This association is maintained in the meta data store, so that whenever a change is made to meta data for one piece of content (e.g., for a track on a CD), then the meta data for the associated piece(s) is also changed (e.g., the ripped version stored in a file on the hard drive).

18 Claims, 8 Drawing Sheets

U.S. PATENT DOCUMENTS

| | | | |
|---|---|---|---|
| 6,760,721 B1 * | 7/2004 | Chasen et al. | 1/1 |
| 6,970,886 B1 * | 11/2005 | Conwell et al. | 1/1 |
| 7,191,190 B2 | 3/2007 | Debique et al. | |
| 2002/0129036 A1 * | 9/2002 | Ho Yuen Lok et al. | 707/104.1 |
| 2005/0047756 A1 | 3/2005 | Evans | |
| 2007/0156773 A1 | 7/2007 | Debique | |
| 2008/0068627 A1 | 3/2008 | Hart et al. | |

OTHER PUBLICATIONS

Windows 98 Highlights: Adding Microsoft Plus! 98 to Windows 98, Running Windows 98? See what you can add with Microsoft Plus! 98, Oct. 16, 1998, 2 pages.

Microsoft Windows 98 Home Pages, "Having Fun-Info for Multimedia Aficionados," last updated Apr. 21, 1999, 2 pages.

"Non Final Office Action", U.S. Appl. No. 11/683,082, (Mar. 19, 2009),11 pages.

"Non-Final Office Action", U.S. Appl. No. 11/683,082, (Dec. 3, 2009),14 pages.

"Final Office Action", U.S. Appl. No. 11/683,082, (Mar. 24, 2010), 18 pages.

"Non-Final Office Action", U.S. Appl. No. 11/683,082, (May 25, 2011), 14 pages

* cited by examiner

220

```xml
<?xml version="1.0" encoding="UTF-8" ?>
<OMI xmlns:sql="urn:schemas-microsoft-com:xml-sql">
    <name>Billboard Top Hits: 1983</name>
    <author>Various Artists</author>
    <releasedate>1992</releasedate>
    <genre>ROCK</genre>
    <style>Pop/Rock</style>
    <rating>8</rating>
    <copyright />
    <label>Rhino</label>
    <parent>AMG</parent>
  + <track>
  - <track>
        <name>Africa</name>
        <author>Toto</author>
    </track>
  - <track>
        <name>Stray Cat Strut</name>
        <author>Stray Cats</author>
    </track>
        .
        .
        .
</OMI>
```

*Fig. 4*

META DATA MANAGEMENT FOR MEDIA CONTENT OBJECTS

RELATED APPLICATIONS

This application is a continuation of U.S. patent application Ser. No. 09/820,088, filed on Mar. 27, 2001, corresponding to published U.S. Application No. 2002-0184180-A1, entitled "Improved Meta Data Management for Media Content Objects", listing Kirt Debique, David Stewart, Gabriel DeBacker and Nosakhare D. Omoigui as inventors, which application is hereby incorporated herein by reference.

TECHNICAL FIELD

This invention relates to data structures and data management, and more particularly to meta data management for media content objects.

BACKGROUND

Computers are becoming increasingly more powerful while at the same time becoming less costly. This has resulted in the increased presence of computers into many homes and business throughout the world. Along with this increase in computing performance and popularity has also come an increase in the number of areas in which computers are used. Where once computers were used primarily for productivity-based applications (e.g., databases, word processing, spreadsheets, and so forth), a wide range of entertainment applications have become increasingly popular.

One such entertainment application is that of media content playback, such as audio (e.g., songs) and audio/video (e.g., movies) playback. For example, computers are often equipped with a CDROM drive that allows the computer to read an audio CD and play the songs on the CD via one or more speakers coupled to the computer. An additional feature that such an entertainment application may provide is the ability to obtain information about a CD (e.g., track names and artist name(s)). This information is commonly referred to as "meta data" corresponding to the CD. The application accesses a database of meta data (e.g., from a remote server) to identify information about the CD (e.g., track names and artist name(s)), and then displays this information to the user.

In addition to playing back media content directly from the source CD, some applications also allow songs to be copied from the source CD and stored as separate files on a local hard drive of the computer, such as in an MP3 or WMA format. This process is commonly referred to as "ripping". These locally stored files can then be played back at a subsequent time directly from the local hard drive without the presence of the source CD in the CDROM drive.

One current problem with these systems, however, is that meta data is typically associated with only one source (e.g., the source CD). Thus, if the user plays back a song directly from a CD, then the meta data corresponding to that CD is displayed to the user. Similarly, if the user rips that same song to a file on the local hard drive and plays that song back from the file on the hard drive, then the meta data corresponding to that file is displayed to the user. However, any changes made (e.g., by the user) to the meta data corresponding to the CD are displayed to the user only when the song is played back directly from the CD, and any changes made to the meta data corresponding to the file are displayed to the user only when the song is played back from the file. Thus, multiple different sets of meta data are created (one for each source) for each song, requiring any changes to the meta data for a song to be made to each of the multiple sets. This creates an inconsistent and unfriendly user experience.

The invention addresses these problems and provides solutions to improve meta data management for media content objects.

SUMMARY

Improved meta data management for media content objects is described herein.

According to one aspect of the improved meta data management, meta data associated with multiple pieces of content (e.g., songs, movies, other audio/video clips, etc.) stored on multiple pieces of media (e.g., CDs, DVDs, etc.) is maintained in a meta data store. The meta data store also includes meta data associated with other pieces of content stored elsewhere, such as songs stored in files on a local hard drive that have been ripped from a CD or DVD. These other pieces of content are associated with the content on the pieces of media, such as being ripped versions of the same song tracks. This association is maintained in the meta data store, so that whenever a change is made to meta data for one piece of content (e.g., for a track on a CD), then the meta data for the associated piece(s) is also changed (e.g., the ripped version stored in a file on the hard drive).

According to another aspect of the improved meta data management, meta data is organized using a disc-centric tree structure, with a disc object being a root object in the tree and multiple children objects (e.g., corresponding to tracks, files, play lists, and so forth) spawning from the disc object. These children can also have their own children object (e.g., file objects). Meta data is maintained for all of these objects, and any changes to the meta data can be readily propagated through the tree to other objects corresponding to the same disc object (the root object).

According to another aspect of the improved meta data management, meta data is maintained for both generally available media and user-created media. Meta data for generally available media (e.g., commercially available CDs or DVDs) can be obtained from a remote server. For user-created media, the computer creating the media has access to the meta data associated with the content of the new media (e.g., songs copied from another CD for which meta data is already available). The computer generates a disc identifier for the user-created media and, for each piece of content on the new media, copies the meta data for that content from the meta data associated with the source of the content (e.g., for a song copied from a CD, the meta data associated with that song corresponding to that CD).

BRIEF DESCRIPTION OF THE DRAWINGS

The present invention is illustrated by way of example and not limitation in the figures of the accompanying drawings. The same numbers are used throughout the figures to reference like components and/or features.

FIG. 4 illustrates an exemplary return of meta data from a meta data server.

DETAILED DESCRIPTION

Figure 1:
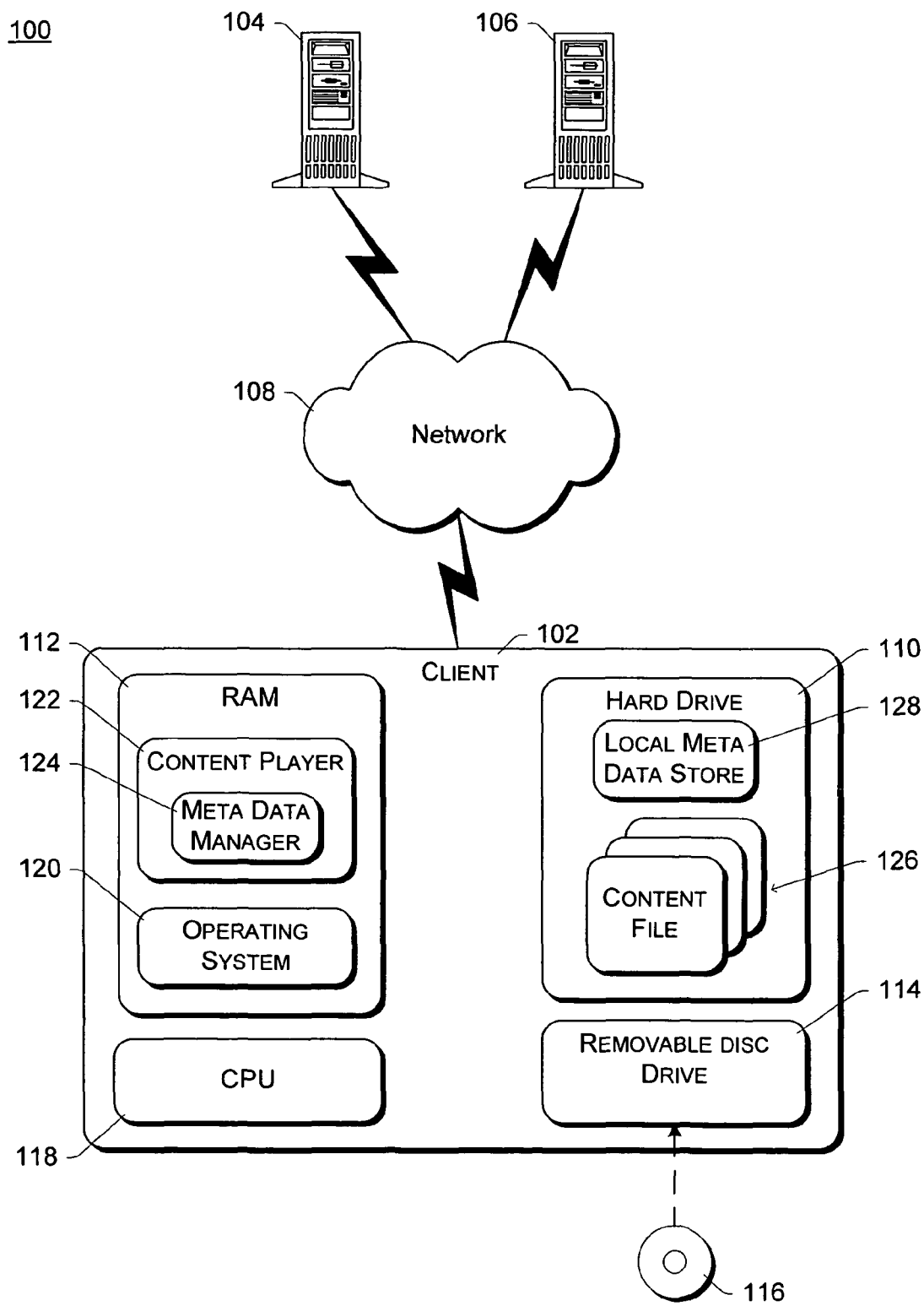
FIG. 1 is a block diagram illustrating an exemplary network environment.

FIG. 1 is a block diagram illustrating an exemplary network environment 100. Environment 100 includes a client computer 102, remote server computers 104 and 106, and a network 108. Network 108 represents any of a wide variety of conventional data communications networks. Network 108 may include public portions (e.g., the Internet) as well as private portions (e.g., an internal corporate Local Area Network (LAN) or a home network), as well as combinations of public and private portions. Network 108 may be implemented using any one or more of a wide variety of conventional communications media including both wired and wireless media. Any of a wide variety of communications protocols can be used to communicate data via network 108, including both public and proprietary protocols. Examples of such protocols include TCP/IP, IPX/SPX, NetBEUI, etc.

Computers 102, 104, and 106 represent any of a wide range of computing devices, and each device may be the same or different. By way of example, devices 102-106 may be desktop computers, multiple-processor fileservers or workstations, laptop computers, handheld or pocket computers, personal digital assistants (PDAs), cellular phones, Internet appliances, consumer electronics devices, gaming consoles, and so forth.

Client computer 102 includes a local hard drive 110, a system memory (Random Access Memory (RAM)) 112, a disc drive 114 for removable media 116, and a central processing unit (CPU) 118. CPU 118 executes an operating system 120, which manages operation of client computer 102 and provides support for input/output operations (e.g., user inputs, audio and/or video input and playback, data communications with other computers via network 108, and so forth). CPU 118 also executes a content player application 122 from memory 112. Content player application 122 provides a user interface allowing a user of computer 102 to select various pieces of media content (also referred to as simply "content") for playback. Content player application 122 also communicates audio data to speakers of computer 102 (optionally via operating system 120) for playing to the user, as well as communicates video data to a display device of computer 102 for playback of video data. Additionally, content player application 122 may also present (e.g., display) to the user meta data corresponding to content being played. This meta data is information describing different aspects or characteristics of the content being played, and/or information related to the content being played. A meta data manager component 124 of content player application 122 manages the storage and modification of meta data, as discussed in more detail below. Although illustrated as separate components, content player 122 and operating system 120 may alternatively be incorporated into the same component (e.g., content player 122 may be one of multiple modules of operating system 120).

Content player application 122 can play pieces of content directly from media 116 inserted into disc drive 114. A piece of content as used herein refers to a segment of data that can be played (e.g., to a user on a computer). The exact nature of a piece of content on media 116 is dependent on the type of media as well as the type of content. For example, for an audio CD, each track of audio data (typically a single song) would be a piece of data. For a movie DVD, the entire movie may be one piece of content, a set of outtakes another piece of content, and a movie preview a third piece of content.

Media 116 can be any of a wide variety of conventional media. As used herein, media 116 is discussed primarily with reference to being a compact disc (CD) or digital versatile disc (DVD), including CDs and DVDs that are read only, rewriteable, or recordable. Alternatively other types of media can be used, such as other types of optical discs, magnetic disks, magnetic tapes, solid state storage devices, and so forth. It is to be appreciated that the nature of drive 114 also varies based on the type of media 116 being used (e.g., an optical disc drive, a magnetic tape drive, and so forth).

Additionally, client 102 may access other media in a manner analogous to accessing media 116. For example, media 116 may be inserted into a disc drive of another computer (or CD "jukebox") and accessed by client 102 via network 108. By way of another example, an Internet radio station may make tracks of data, analogous to tracks of data on a CD, accessible to client 102.

In addition to being used as a direct source for content playback, media 116 may be used as the source for content that is stored as one or more files on hard drive 110. Content player application 122 can manage the copying (ripping) of content from media 116 to a file 126 of hard drive 110, or alternatively another component such as operating system 120 or a component on another computer (not shown) may manage the copying. Each of these ripped files is another version of the corresponding piece of content from media 116. Each of the content files 126 typically stores a single piece of content, and may use any of a wide variety of public and/or proprietary formats, such as MPEG Audio Layer 3 (MP3), Windows Media audio file (WMA), and so forth.

During operation, meta data manager 124 maintains a record (explicitly or implicitly) of different media pieces 116, such as different CDs, that are inserted into disk drive 114. When coupled to network 108, meta data manager 124 communicates with server 104 and/or 106 to retrieve meta data corresponding to the different media 116 that has been inserted into disc drive 114. Meta data manager 124 stores this received meta data locally (e.g., as local meta data store 128 on hard drive 110) for subsequent use by content player application 122.

Content player application 122, including meta data manager 124, provides an enhanced content playback experience by presenting, to the user, meta data corresponding to various pieces of content. The meta data can be displayed while the content is being played, as well as at other times (e.g., allowing the user to look back through content that he or she has previously played). Meta data manager 124 obtains (from server 104 and/or 106) meta data for each piece of content (e.g., each song) on a particular piece of media (e.g., each CD) that has been inserted into disc drive 114. This meta data is obtained even though the user may not have actually played the corresponding content—the mere insertion of the media is sufficient. In the illustrated example meta data manager 124 obtains only the meta data for pieces of media it is aware of (e.g., those that have been inserted into disc drive 114). Alternatively, other meta data may also be obtained and stored in local meta data store 128. For example, a user may identify a preferred artist and all meta data available for all of that artist's CDs may be obtained and stored in local meta data store 128.

Meta data manager 124 associates meta data with the particular pieces of removable media 116 and further associates all pieces of content (e.g., songs, movies, and so forth) that are on or originate from particular media 116 with that particular media 116. Thus, meta data for a particular song from a particular disc is associated with that song, regardless of whether it is played to the user directly from media 116 or from one of content files 126 that was ripped from media 116.

In the illustrated example, the meta data is stored at servers 104 and 106 and is available from a "disc-centric" point of view. This "disc-centric" point of view organizes meta data on a per-disc basis, with tracks on that disc and files ripped from those tracks corresponding to the particular disc. A disc identifier is used for tracking the meta data for the disc. In the case of CDs, CDs typically store songs as different tracks on the CD, and each track is made up of multiple "frames" of audio data. In one implementation, each frame of audio data is 1/75 of a second. Typical audio CDs store table of contents (TOC) information, which refers to: the total number of tracks on the disc, the starting frame offset of each track, and the total number of frames on the disc. The disc identifier is generated by summing together this table of contents information (the total number of tracks on the disc, the starting frame offset of each track, and the total number of frames on the disc). It should be noted that generating a disc identifier in this fashion does not guarantee that each disc identifier is unique. However, it does provide an almost-unique value (that is, it is possible for two different CDs to have the same disc identifier, but highly unlikely).

Alternatively, the disc identifier may be generated in different manners for CDs, as well as different manners for different types of media. For example, a disc identifier for a DVD may be generated based on a CRC 64 (64-bit Cyclical Redundancy Checking) of portions of the DVD. In one implementation, these portions are the first parts (e.g., 64 Kb) of the video_ts.ifo and the vts_01_0.ifo on a DVD disc.

When meta data manager 124 desires meta data for a particular disc, manager 124 communicates the disc identifier to one of servers 104 and 106. The receiving server 104 or 106 uses the disc identifier as an index into the meta data stored at the server. If the disc identifier matches a disc identifier at the server, then the meta data associated with that matching server is returned to meta data manager 124.

Servers 104 and 106 can store public and/or private meta data. Public meta data refers to data that is generally available to the public as a whole (although possibly subject to licensing fees or other restrictions). Private meta data refers to data that is intended for only a particular one or more users. For example, a user may generate his or her own meta data and communicate it to a server as private meta data. Subsequent accesses to the server by the user (the identity of which can be verified in any of a variety of conventional manners, such as a user name and password) allow this meta data to be received. By storing such private meta data on a server, a user can generate his or her own data and have that data "follow" him or her to different locations. For example, a user may generate private meta data from his or her home computer and store it on a remote server. The user can then access that server from another location (e.g., his or her portable audio device, an Auto PC, and so forth) and have that previously generated private data available at the other location. Thus, if the user generates special meta data for a CD on his or her home computer, when the user inserts the CD into his or her Auto PC, the same special meta data can be retrieved from the server and rendered by the Auto PC.

Content player 122 maintains a tree-structure of objects associated with particular media 116. In the illustrated examples, this tree-structure is a "disc-centric" structure placing a disc identifier as the root node and then one or more levels of children depending from the root node.

Figure 2:
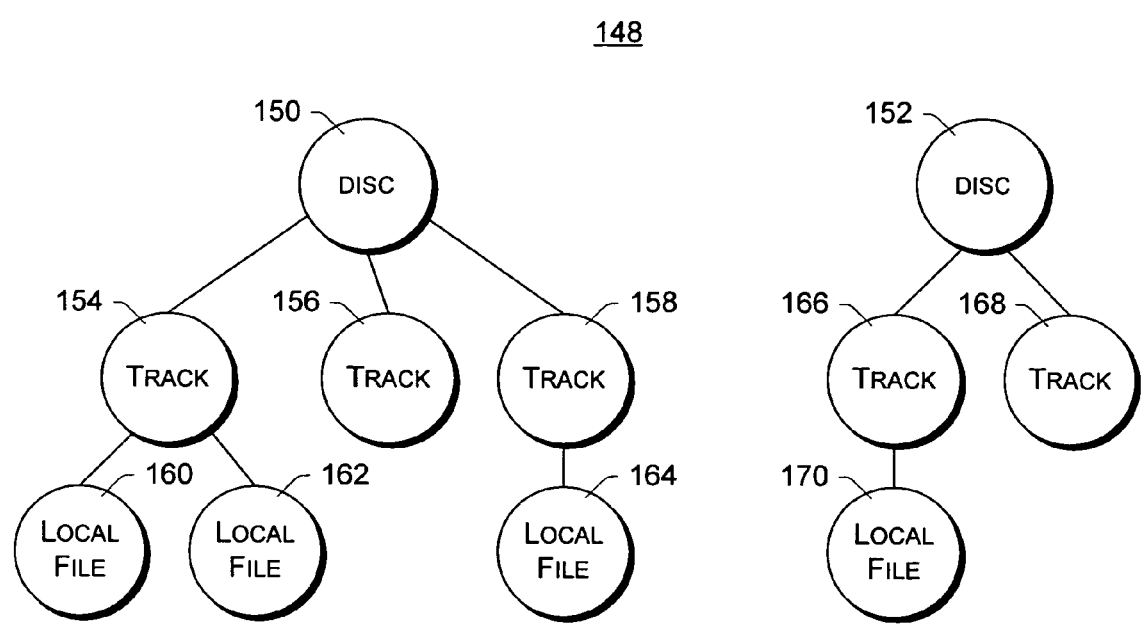
FIG. 2 illustrates an exemplary tree structure of media content objects associated with particular media.

FIG. 2 illustrates an exemplary tree structure 148 of media content objects associated with particular media. Each object in tree structure 148 can have meta data associated with it. Two root node objects 150 and 152 are illustrated, each corresponding to a particular optical disc. Root object 150 has three children objects 154, 156, and 158, each of which is one track on the disc corresponding to object 150. Additionally, track object 154 has two children 160 and 162, each of which is a file that has been ripped to a local hard drive, and each of which is a ripped version of the track corresponding to track object 154. Furthermore, track object 158 has one child 164, which is a file that is stored on the local hard drive and is a ripped version of the track corresponding to track object 158. The track corresponding to track object 156 has not been ripped to any files on the local hard drive, and thus track object 156 does not have any children.

Similarly, two track objects 166 and 168 are child objects from root disc object 152. Track object 166 has a file child object 170, while track object 168 has no children.

The tree structure of FIG. 2 allows meta data manager 124 to readily propagate meta data, as well as changes to meta data, through the various objects associated with a particular disc (or other media). For example, if a user desired to correct a typographical error that occurred in the name of a song corresponding to track 154, given the relationships identified in FIG. 2 the association of ripped file objects 160 and 162 to track object 154 can be readily identified, and the correction also made in the name of the song corresponding to each of the ripped file objects 160 and 162.

The discussions herein refer primarily to a disc-centric point of view as illustrated in FIG. 2. Alternatively, the database may be structured from other view points. For example, rather than the disc object as a root node there may be an "anthology" object as the root node, with each of the disc objects 150 and 152 being children of the anthology object. An anthology may include, for example, a set of multiple CDs corresponding to the same artist, genre, time period, etc. In this situation, any meta data changes can be propagated across multiple CDs (e.g., a performance date for the anthology may be changed and this change propagated to each CD in that anthology). By way of additional examples, other points of view may have artist names as root nodes, genres as root nodes, and so forth.

Additionally, it should be noted that even though a disc-centric point of view is used, an object can be a child of objects that are (or lead to) two different root node objects. For example, as discussed in more detail below, a new CD may be created by a user that includes tracks from another source CD. In this situation, the track objects can be linked to parent root node objects that are the root nodes for both the new CD as well as the source CD.

The tree structure of FIG. 2 can be implemented using any of a wide variety of data structures.

Figure 3:
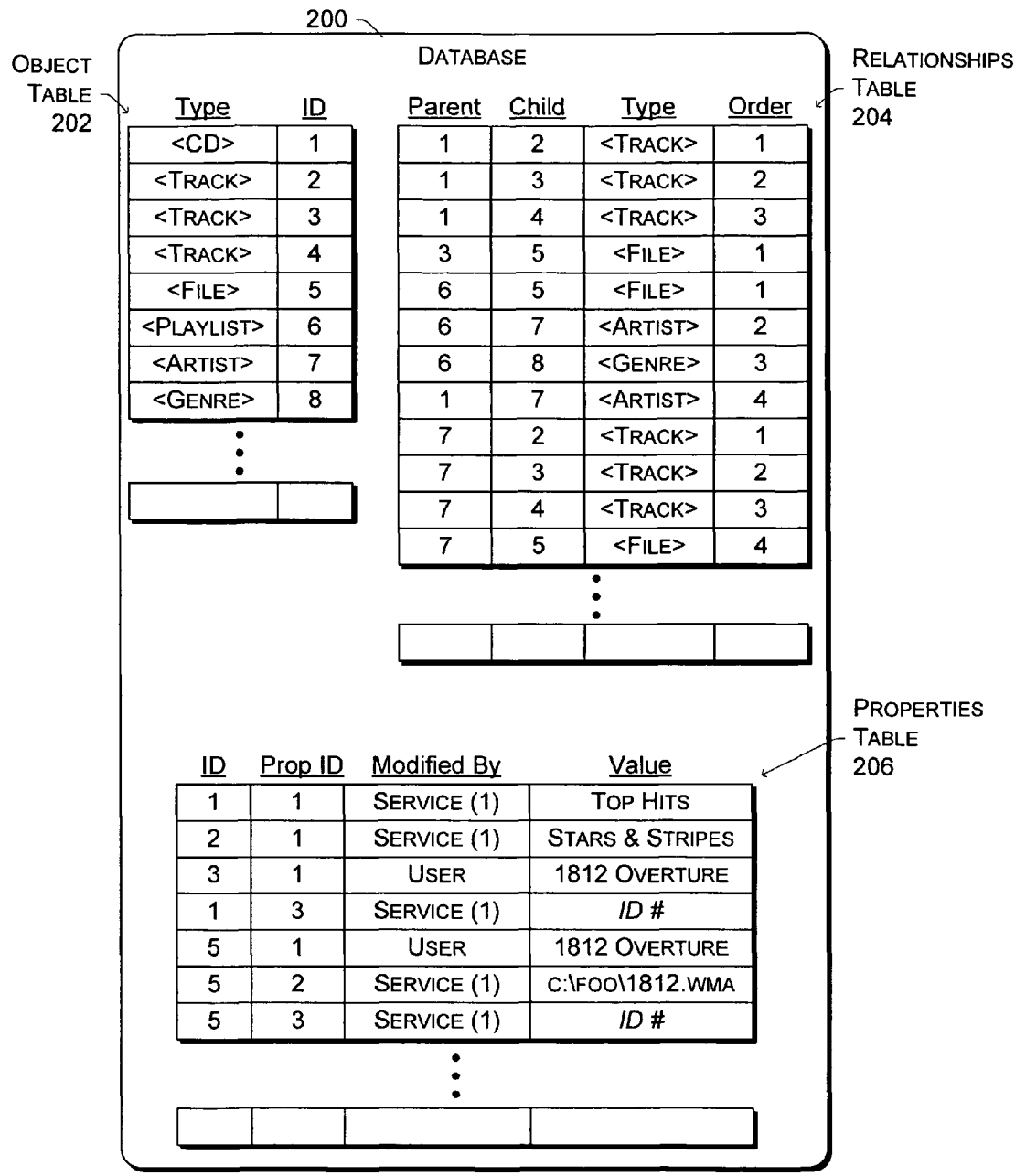
FIG. 3 illustrates an exemplary database that implements the tree structure of FIG. 2.

FIG. 3 illustrates an exemplary database 200 that implements the tree structure of FIG. 2. Database 200 is illustrated including an object table 202, a relationships table 204, and a properties table 206. Object table 202 identifies multiple objects in database 200, relationships table 204 maintains a mapping of objects to each other in a specific order, and properties table 206 maintains a set of properties (meta data) for objects in database 200. FIG. 3 illustrates database 200 populated with example data for purposes of explanation.

Object table 202 identifies the objects that are in database 200. As used herein, an object refers to an entity that can have "children" (that is, one or more other related objects) and properties associated with it. For example, an object may be a disc, a track on a disc, a file ripped from a track on a disc, a play list identifying multiple tracks and/or files, an artist (corresponding to a disc, a track, a file, etc.), a genre (corresponding to a disc, a track, a file, etc.), and so forth. In the illustrated example of FIG. 3, several different objects are identified.

Object table 202 includes two fields: a type field and an ID field. For each entry in object table 202, the type field identifies what type of object is described in the entry and the ID field identifies a unique identifier (unique within database 200) of the object. In one implementation, the type field includes a globally unique ID that corresponds to the type of object described in the entry. The ID for an object is used to identify the object in the relationships table 204 and properties table 206. The ID for each object can be assigned in any of a wide variety of manners, and in the illustrated example each object is assigned an ID that is the order the object is entered into object table 202 relative to the other objects in the table. In the illustrated example of FIG. 3, a CD is assigned the ID of "1", three CD tracks are assigned the ID's of "2", "3", and "4", respectively, a file is assigned the ID of "5", and so forth.

Additional fields may also optionally be included in object table 202. For example, a "description" field may be adding allowing information describing the entry to be included (e.g., a brief description of what object the globally unique ID refers to, such as "compact disc").

Relationships table 204 identifies relationships between different objects in database 200. Each entry in relationships table 204 identifies a parent/child relationship between two objects identified in object table 202. Relationships table 204 includes four fields: a parent field, a child field, a type field, and an order field. The parent field identifies one of the objects in object table 202 by its ID, while the child field identifies another of the objects in object table 202 by its ID. The parent and child fields identify a parent/child relationship between these two identified IDs. For example, the first entry in relationships table 204 indicates that the object with an ID of 2 is a child of the object with an ID of 1. Thus, in conjunction with object table 202, this first entry indicates that the track with an ID of 2 is a child of the CD with an ID of 1 (in other words, the track with an ID of 2 is a track on the CD with an ID of 1).

The type field in relationships table 204 indicates what type of object the object referenced in the child field of the entry is. For example, the first entry indicates that the object with an ID of 2 is a track object. This is a duplicate of the information stored in object table 202, and is included to increase efficiency in accessing database 200. For example, to identify all of the tracks with the same parent, a search can be performed based on the parent and type fields of relationships table 204. Alternatively, the type field may not be included in relationships table 204.

The order field in relationships table 204 identifies the order in which each entry for each parent object is added to relationships table 204. The first relationship entered in table 204 for a particular parent object has an order of "1", the second has an order of "2", and so forth.

Additional fields may also optionally be included in relationships table 204. For example, an additional type field may be included that indicates what type of object the object referenced in the parent field of the entry is. By way of another example, a User ID field may be included that identifies which user inserted the CD that resulted in the relationship for that entry. The User ID field may be used, for example, to allow meta data for multiple different users to be stored in the same database 200, but also allow a particular user to access only the meta data that corresponds to discs the user inserts into the disc drive.

Properties table 206 stores meta data for the objects identified in object table 202. Properties table 206 includes four fields: an ID field, a property (prop) ID field, a "modified by" field, and a value field. For each entry, the ID field identifies one of the objects in object table 202 by its ID. The property ID field for is the entry identifies a particular property that the entry corresponds to. Multiple pieces of meta data can be associated with an object (e.g., the title of a CD, the artist of a CD, a performance date, and so forth). Multiple property ID values are established that uniquely identify the different possible pieces of meta data, and for each entry the property ID field includes one of those ID values.

The "modified by" field identifies the source of the meta data for the entry. The modified by field may indicate a particular service that is the source of the meta data (e.g., one of servers 104 or 106 of FIG. 1), or alternatively that the user is the source of the meta data. The value field identifies the meta data for the entry. Any of a variety of meta data can be stored in the value field, and optionally may be modified by the user. For example, properties table 206 indicates that the object having an ID of 3 (which is a CD track) has a user-set value of "1812 Overture".

Although illustrated as a single field, the value field may optionally be multiple data-dependent fields (e.g., a numeric value field, a text value field, a date value field, and a binary value field).

The meta data illustrated in database 200 can be received from a remote server, such as server 104 or 106 of FIG. 1. This meta data can be returned to the client computer implementing database 200 in any of a wide variety of formats. FIG. 4 illustrates an exemplary return of meta data from a meta data server. The meta data 220 illustrated in FIG. 4 is returned in an extensible markup language (xml) format. Alternatively, other public and/or proprietary formats can be used. As illustrated, meta data 220 indicates that the name of the disc is "Billboard Top Hits: 1983", the author is "Various Artists", the release date for the disc is "1992", the genre of the disc is "rock", the style of the disc is "Pop/Rock", and the rating of the disc is "8". Additionally, there is no copyright information in meta data 200 for the disc, indicating that the remote server does not have the copyright meta data for the disc. Additionally, the tracks of the disc are identified in meta data 220 in order, so the first track on the disc has the name "Africa" and the author "Toto", the second track on the disc has the name "Stray Cat Strut" and the author "Stray Cats", and so forth.

Returning to FIG. 3, the various tables in database 200 allow changes to the meta data in the database to be automatically propagated to other related objects. For example, assume that the meta data received from a server 104 or 106 of FIG. 1 for the object having an ID of 3 (a CD track) indicates that the title is "Tchaikovsky: 1812 Overture". Further assume that the user changes the title for that track to be simply "1812 Overture". The meta data manager then checks relationships table 204, which indicates that the object having an ID of 3 has a child with an ID of 5 (a file, as indicated in object table 202). The meta data manager thus also changes the title data, in properties table 206, for the object having an ID of 5 to be the new title. Thus, regardless of whether the user subsequently selects playback of Tchaikovsky's 1812 Overture from the CD or the file, the meta data stored in database 200 indicates that the title is simply "1812 Overture".

Additional fields may also optionally be included in properties table 206. For example, a type field may be included (analogous to the type field in relationships table 204) that identifies what type of object the object referenced in the ID field is. By way of another example, properties for particular objects may be organized into different property sets, such as pre-defined properties and user-defined properties. In this situation, an additional field may be included in properties table 206 that identifies which property set the entry refers to.

In addition to tables 202, 204, and 206, one or more additional tables may optionally be included in database 200. In one implementation, these additional tables include a property set types table, a property types table, a users table, and an object values table. Each entry in the property set types table identifies a globally unique ID for a property set, a corresponding ID for that property set, and a description of that property set. Each entry in the property types table identifies one of the property set ID's from the property set types table, a number associated with the property ID, a data type associated with the property (e.g., a numeric value, a text value, a date value, or a binary value), and a description of the property. Each entry in the users table identifies a user ID and corresponding user name of the computer on which database 200 is implemented. Each entry in the object values table identifies an object ID from object table 202, an instance number of the object in the object values table, and optionally an identification of the user that created the object (e.g., a sequential ID based on the user's logon name).

Exemplary objects and properties are illustrated in FIG. 3, although a wide range of objects and associated properties may be included in database 200. The following tables illustrate an exemplary set of objects and the properties that may be associated with those objects in accordance with certain implementations. Additionally, the attached Appendix identifies a set of interfaces and functions that can be used in accordance with certain implementations to create, manage, and modify different schemes (e.g., different databases 200 of FIG. 3), and objects within those schemes.

| Object Types | |
|---|---|
| Object Name | Description |
| Genre | The genre or category of the content. |
| CDGenre | The genre or category of a CD. |
| CDArtist | The artist of a CD. |
| CDAlbum | A CD album. |
| Artist | The artist of content. |
| UserCollection | A user-defined collection of content. |
| Album | An album. |
| AlbumTrack | A track of an album. |
| AlbumPlaylist | A play list for an album. |
| Playlist | A play list of content. |
| PlaylistFromAlbum | A play list of ripped tracks associated with an album. |
| Track | A track of content on media. |
| Batch | A list of disc(s) for which meta data has not been downloaded yet (allowing for batch processing of downloads when network connection is made). |
| Link | A URL reference and friendly name about an object. For example, "More about Sting" would be a friendly name and the URL reference would be "http://....sting.com". |
| Picture | An image corresponding to content. |
| ChildListEntry | A list of the children tracks in a play list. |
| DVD | A DVD. |
| DVDTitle | The title of a DVD. |
| DVDChapter | A chapter of a DVD. |
| Factoid | One or more facts or comments associated with an album or content. Different factoids may be tied to different frames or other segments of the album or content. |

| Genre Object | |
|---|---|
| Property Name | Description |
| Name | The name of the genre. |
| NumMediaChildren | The total number of children of the object that are media content. |
| NumAudioMediaChildren | The total number of children of the object that are audio media content. |
| NumVideoMediaChildren | The total number of children of the object that are video media content. |

| CDGenre Object | |
|---|---|
| Property Name | Description |
| Name | The name of the genre or category of a CD. |

| CDArtist Object | |
|---|---|
| Property Name | Description |
| Name | The name of an artist of a CD. |
| Role | The role of an artist of a CD (e.g., lead singer, backup singer, keyboard, etc.). |

| CDAlbum Object | |
|---|---|
| Property Name | Description |
| Title | The title of the CD. |
| Copyright | Copyright information for the CD. |
| Label | The recording company label that produces the CD. |
| ReleaseDate | The date of release of the CD. |
| Rating | A rating for the CD. |
| RatingOrg | An organization that rated the CD. |
| CDID | A hashed value of the disc identifier, allowing for faster lookups. |
| TOC | The disc identifier (based on the table of contents information) for the CD. |
| LastPlayed | The last time a track of the CD was played on the computer. |
| Artist | The artist of the CD. |
| Genre | The genre or category of the CD. |
| NumMediaChildren | The total number of children of the object that are media content. |
| NumAudioMediaChildren | The total number of children of the object that are audio media content. |
| NumVideoMediaChildren | The total number of children of the object that are video media content. |

Artist Object

| Property Name | Description |
| --- | --- |
| Name | The name of an artist of a CD. |
| Role | The role of an artist of a CD (e.g., lead singer, backup singer, keyboard, etc.). |
| NumMediaChildren | The total number of children of the object that are media content. |
| NumAudioMediaChildren | The total number of children of the object that are audio media content. |
| NumVideoMediaChildren | The total number of children of the object that are video media content. |

UserCollection Object

| Property Name | Description |
| --- | --- |
| Name | The name of the user-defined collection of content. |

Album Object

| Property Name | Description |
| --- | --- |
| Title | The title of the album. |
| Copyright | Copyright information for the album. |
| Label | The recording company label that produces the album. |
| ReleaseDate | The date of release of the album. |
| Rating | A rating for the album. |
| RatingOrg | An organization that rated the album. |
| CDID | A hashed value of the disc identifier for the album, allowing for faster lookups. |
| TOC | The disc identifier (based on the table of contents information) for the album. |
| LastPlayed | The last time content from the album was played on the computer. |
| Artist | The artist of the album. |
| Genre | The genre or category of the album. |
| NumMediaChildren | The total number of children of the object that are media content. |
| NumAudioMediaChildren | The total number of children of the object that are audio media content. |
| NumVideoMediaChildren | The total number of children of the object that are video media content. |

AlbumTrack Object

| Property Name | Description |
| --- | --- |
| Title | The title of a track of the album. |
| Lyrics | The lyrics for the content of the track. |
| LengthInMilliseconds | The length of the track (in milliseconds). |
| LastPlayed | The last time the track was played on the computer. |
| Album | The name of the album the track is on. |
| Artist | The artist of the track. |
| Genre | The genre or category of the track. |
| OriginalIndex | The original position of the track on the album it came from. |
| RipFilename | The name of a file ripped from the track. |
| Enabled | Whether the track is marked as "playable" on the album. Non-enabled tracks appear "grayed out" in the user interface and are skipped over rather than played when the album is played. |
| TOC | The disc identifier (based on the table of contents information) of the original CD the track was on. |
| PlayCount | The number of times the track has been played on the computer. |
| LastEditedBy | An identification of the last entity (either the name of the meta data provider or "user") to edit any property associated with the object. |
| Provider | The name of the original meta data provider. |
| Composer | The composer of the album. |
| CoverArtSmall | A small graphic of the album's cover art. |
| CoverArtLarge | A larger graphic of the album's cover art. |

AlbumPlaylist Object

| Property Name | Description |
| --- | --- |
| Name | The name of the album play list. |
| Copyright | Copyright information for the album. |
| Label | The recording company label that produces the album. |
| ReleaseDate | The date of release of the album. |
| Rating | A rating for the album. |
| Style | The style of the content in the play list. |
| CDID | A hashed value of the disc identifier, allowing for faster lookups. |
| TOC | The disc identifier (based on the table of contents information) for the album. |
| LastPlayed | The last time a track in the play list was played on the computer. |
| Artist | The artist of the album. |
| Genre | The genre or category of the album. |
| Parent | The parent of the object. |
| LastPlaylistEntryID | The ID of the last entry in the play list. |
| LastEditedBy | The user that last edited the play list. |
| Composer | The composer of the album. |
| TotalDuration | The total play time of the content on the play list. |
| BuyNow | Information on how to purchase the album. |
| MoreInfo | A URL to a web page with more information about the object. |

PlaylistProperties Object

| Property Name | Description |
| --- | --- |
| Name | The name of the play list. |
| NumMediaChildren | The total number of children of the object that are media content. |
| NumAudioMediaChildren | The total number of children of the object that are audio media content. |
| NumVideoMediaChildren | The total number of children of the object that are video media content. |
| LastPlaylistEntryID | The ID of the last entry in the play list. |
| Attributes | A set of one or more flags that specify different play list attributes, such as a "deleted" indicating the play list is marked for deletion. |
| CreationTime | The time the play list was created. |
| LastModifiedTime | The last time the play list was modified. |

PlaylistProperties Object

| Property Name | Description |
|---|---|
| TotalDuration | The total playtime of content on the play list. |
| Author | The author of the play list. |
| Genre | The genre or category of content on the play list. |
| Copyright | Copyright information for the content on the play list. |

PlaylistFromAlbum Object

| Property Name | Description |
|---|---|
| Name | The name of the play list. |

Track Object

| Property Name | Description |
|---|---|
| Filename | The filename of the track on the hard drive. |
| Title | The title of the track. |
| Subtitle | Subtitle information for the track. |
| Copyright | Copyright information for the track. |
| FileType | Type of file (e.g., MP3 or WMA). |
| Time | The time the file was created. |
| Date | The date the file was created. |
| Language | The language the content of the track is in. |
| MediaType | The type of media the track is on. |
| PartInSet | Indicates which part of a set the track is on (e.g., which disc of a multiple-disc set). |
| EncodedBy | Name of the person who ripped the track. |
| Publisher | The publisher of the media the track is on. |
| TrackNumber | The number of the track on the media. |
| RecordingDates | The recording date(s) of the track. |
| NetRadioStation | The name of an Internet-accessible radio station where the track is received from. |
| NetRadioOwner | The owner of an Internet-accessible radio station where the track is received from. |
| Year | Year of original recording of the track. |
| BeatsPerMinute | The number of beats per minute in the content of the track. |
| MusicalKey | The musical key the content of the track is in. |
| LengthInMilliseconds | The length of the track (in milliseconds). |
| Album | The album the track is on. |
| OriginalAlbum | Name of album the track first appeared on. |
| OriginalFilename | First filename of the track (same as the Filename if it has not been renamed since created). |
| OriginalReleaseYear | The year the track was original released in. |
| FileOwner | Name of person with rights to this file. |
| Size | The size (e.g., in frames) of the track on the media. |
| ISRC | The International Standard Recording Code. |
| Software | Name of the software that ripped the track. |
| Rating | A rating for the track. |
| Comment | Comments regarding the track. |
| CDID | A hashed value of the disc identifier, allowing for faster lookups. |
| TOC | The disc identifier (based on the table of contents information) for the media storing the track. |
| Genre | The genre or category of the track. |
| Ripped | Whether the track has been ripped to a file. |
| OriginalIndex | The position on the album that the track appeared on. |
| LastEditedBy | An identification of the last entity (either the name of the meta data provider or "user") to edit any property associated with the object. |
| MediaTypeId | An identifier of the media type the track is on. |
| Attributes | A set of one or more flags that specify different play list attributes, such as a "deleted" indicating the play list is marked for deletion. |
| PlayCount | The number of times the track has been played. |
| Bitrate | The encoding rate of the file. |
| Protected | Flag indicating whether digital rights management (DRM) is used on the file. |
| CreationTime | The time the file was first added to the database. |
| LastModifiedTime | The last time any attribute of the track was changed in the database. |
| Composer | The composer of the track. |
| CoverArtSmall | A small graphic of the cover art of the media including the track. |
| CoverArtLarge | A larger graphic of the cover art of the media including the track. |
| TrackedFilename | An identifier of the file in the file system of the operating system using the database, allowing the file to be searched if it is not accessible by filename. |
| Lyrics | The lyrics for the content of the track. |

Batch Object

| Property Name | Description |
|---|---|
| CDID | A hashed value of a disc identifier, allowing for faster lookups. |
| NumTracks | A number of tracks on the disc. |
| TOC | A disc identifier. |

Link Object

| Property Name | Description |
|---|---|
| Name | Friendly display name of a link. |
| URL | URL of the linked content. |

Picture Object

| Property Name | Description |
|---|---|
| Caption | A text description for a picture. |
| URL | A uniform resource locator of where the picture is located. |
| TrackedLink | An identifier of the picture in the file system of the operating system using the database, allowing the file to be searched if it is not accessible by filename. |
| Thumbnail | A thumbnail image for the picture. |

CustomData Object

| Property Name | Description |
|---|---|
| Name | The name of the object. |
| NumericValue | A numerical value for the object. |
| TextValue | A text value for the object. |
| DateValue | A date value for the object. |

CustomData Object

| Property Name | Description |
| --- | --- |
| BinaryValue | A binary value for the object. |
| UnicodeTextValue | A unicode text value for the object. |

ChildListEntry Object

| Property Name | Description |
| --- | --- |
| ObjectType | GUID of the object type for the object. |
| ObjectInstanceID | Actual ID of the object. |
| ListPosition | Position of the media object in the play list. |
| ListInstanceID | Instance ID of the media object in the play list object. |

DVD Object

| Property Name | Description |
| --- | --- |
| Title | The title of the DVD. |
| Genre | The genre or category of the content on the DVD. |
| Director | The director of the content on the DVD. |
| ReleasedBy | The entity that released the DVD. |
| ProducedBy | The producer of the content on the DVD. |
| Studio | The studio that owns the content on the DVD. |
| Duration | The total playback time of the content on the DVD (or a portion of the content, such as a movie). |
| Rating | The rating of the content on the DVD. |
| RatingOrg | The organization that gave the rating for the content. |
| Copyright | Copyright information for the content on the DVD. |
| Comment | Comments regarding the DVD. |
| ReleaseDate | The release date of the DVD. |
| URL | Locator (URL) of the DVD for rendering. |
| ID | DVD identifier generated from a CRC 64 of portions of the DVD content. |
| LeadPerformers | The names of the lead performers in the content on the DVD. |
| BuyNow | Information on how to purchase the DVD. |
| MoreInfo | A URL to a web page with more information about the DVD. |
| CoverArtSmall | A small graphic of the cover art of the DVD. |
| CoverArtLarge | A larger graphic of the cover art of the DVD. |
| MPAA Rating | A rating assigned by the Motion Picture Association of America (MPAA) to the content of the DVD. |

DVDTitle Object

| Property Name | Description |
| --- | --- |
| Name | The name of the title (the primary content) of a DVD. |
| Genre | The genre or category of the title. |
| Director | The director of the title. |
| ReleasedBy | The entity that released the title. |
| ProducedBy | The producer of the title. |
| Studio | The studio that owns the title. |
| Duration | The total playback time of the title. |
| Rating | The rating of the title. |
| RatingOrg | The organization that gave the title the rating. |
| Copyright | Copyright information for the title. |
| Comment | Comments regarding the title. |
| ReleaseDate | The release date of the title. |
| LeadPerformers | The names of the lead performers in the title. |
| MPAARating | A rating assigned by the Motion Picture Association of America (MPAA) to the title. |
| ID | DVD identifier generated from a CRC 64 of portions of the DVD content. |

DVDChapter Object

| Property Name | Description |
| --- | --- |
| Name | The name of a chapter on a DVD. |
| Genre | The genre or category of the chapter. |
| Director | The director of the chapter. |
| ReleasedBy | The entity that released the chapter. |
| ProducedBy | The producer of the chapter. |
| Studio | The studio that owns the chapter. |
| Duration | The total playback time of the chapter. |
| Rating | The rating of the chapter. |
| RatingOrg | The organization that gave the chapter the rating. |
| Copyright | Copyright information for the chapter. |
| Comment | Comments regarding the chapter. |
| ReleaseDate | The release date of the chapter. |
| LeadPerformers | The names of the lead performers in the chapter. |
| MPAA Rating | A rating assigned by the Motion Picture Association of America (MPAA) to the chapter. |
| ID | DVD identifier generated from a CRC 64 of portions of the DVD content. |

Factoid Object

| Property Name | Description |
| --- | --- |
| Fact | The content (e.g., fact or comment) of the factoid. |

Figure 5:
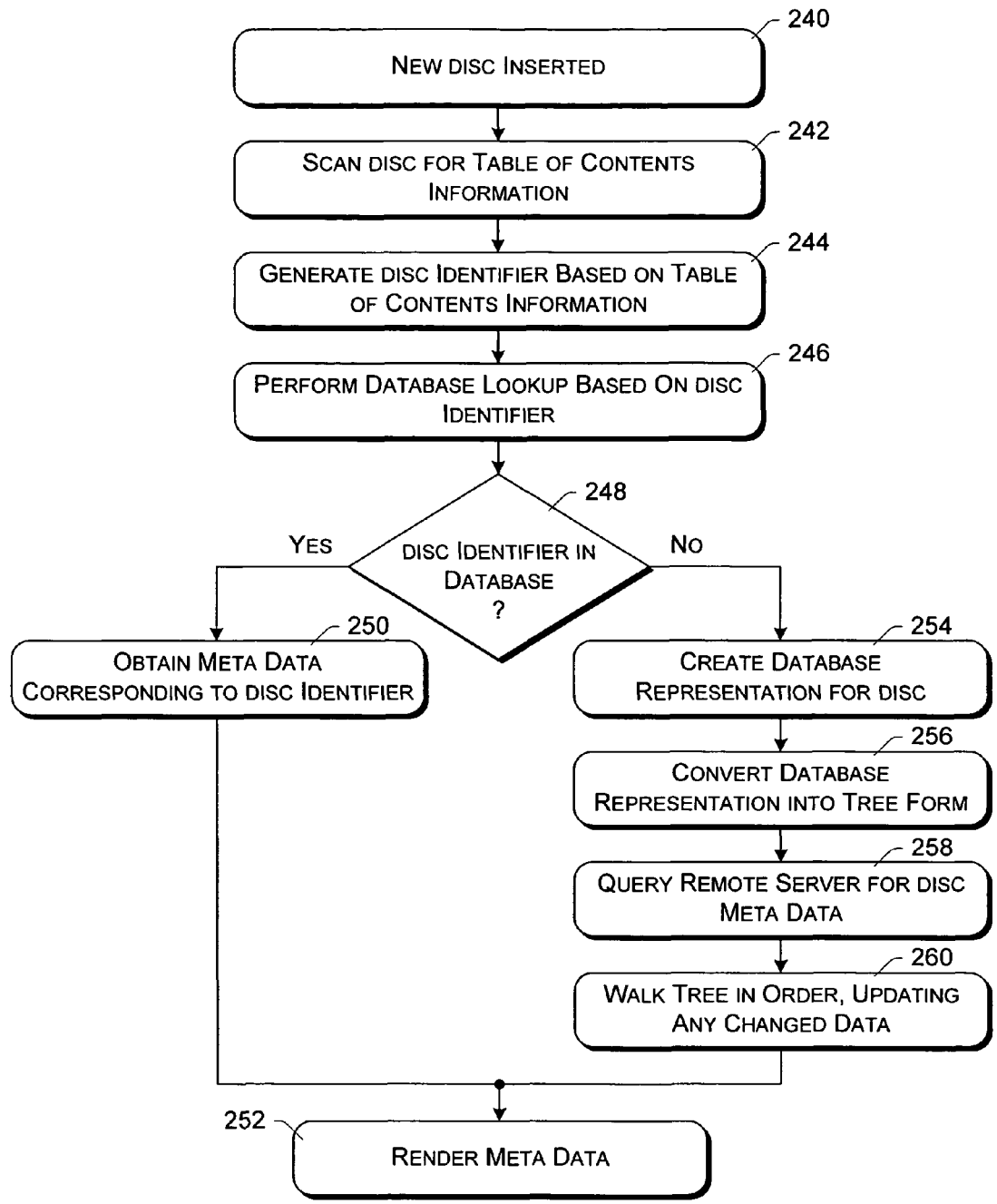
FIG. 5 is a flowchart illustrating an exemplary process for rendering media content meta data.

FIG. 5 is a flowchart illustrating an exemplary process for rendering media content meta data. The process of FIG. 5 is carried out by meta data manager 124 of FIG. 1, and may be implemented in software. The process of FIG. 5 is discussed with reference to a CD, although other types of media may alternatively be used.

Initially, a disc is inserted to the computer (act 240). The disc is then scanned for its table of contents information (act 242) and a disc identifier is generated based on the table of contents information (act 244).

A database lookup is then performed based on the disc identifier (act 246), to determine whether the disc identifier exists in the database. In the example of FIG. 3, this can be accomplished by checking the value for each entry in properties table 206 that has a property ID for a disc identifier. If any of the values are the same as the generated disc identifier, then the disc identifier already exists in the database; otherwise, the disc identifier does not already exist in the database. The result of this lookup is then used to determine the appropriate course of action (act 248).

If the disc identifier is in the database, then the meta data corresponding to the disc identifier is obtained from the database (act 250) and rendered, or otherwise made available, to the user (act 252). Returning to act 248, if the disc identifier is not in the database, then a database representation is created for the disc (act 254). This database representation includes the data that will be placed in the tree structure (e.g., the disc identifier and an indication of each track on the disc). The database representation is then converted into tree form (act 256), with the disc identifier as the root node and a child node for each track on the disc. The unknown meta data for each node object is initially identified as "unknown" (some meta data, such as disc identifier, is known and can be stored in the database). A remote server is then queried for the disc meta data (act 258). In the illustrated example, this querying is performed by communicating the disc identifier to a remote server(s), which in turn accesses the meta data it stores for any meta data corresponding to the disc identifier, and returns that meta data to the requesting computer. Processing then continues with walking the tree in order, updating any changed meta data (act 260) to replace the values of "unknown" with the values received from the server, and rendering the meta data (act 252).

It should be noted that the remote server may not always be accessible. For example, the client 102 of FIG. 1 may not always be coupled to network 108 (e.g., the Internet), and thus not be able to access servers 104 and 106. In these situations, meta data manager 124 keeps the values of "unknown" for the unknown meta data and then accesses server 104 or 106 when the client is coupled to network 108. At this point, the meta data is obtained from servers 104 and/or 106, and the local meta data store updated appropriately. In one implementation, meta data manager 124 maintains a separate record (e.g., in a separate file) of disc identifiers for CDs that were added to the database when servers 104 and 106 were not accessible to client 102. Thus, meta data manager 124 can readily ascertain which meta data it needs from servers 104 and 106. Alternatively, no such separate record may be maintained, and the database may be searched to identify "unknown" values and determine, based on the tree structure, which disc identifiers correspond to the needed meta data.

Figure 6:
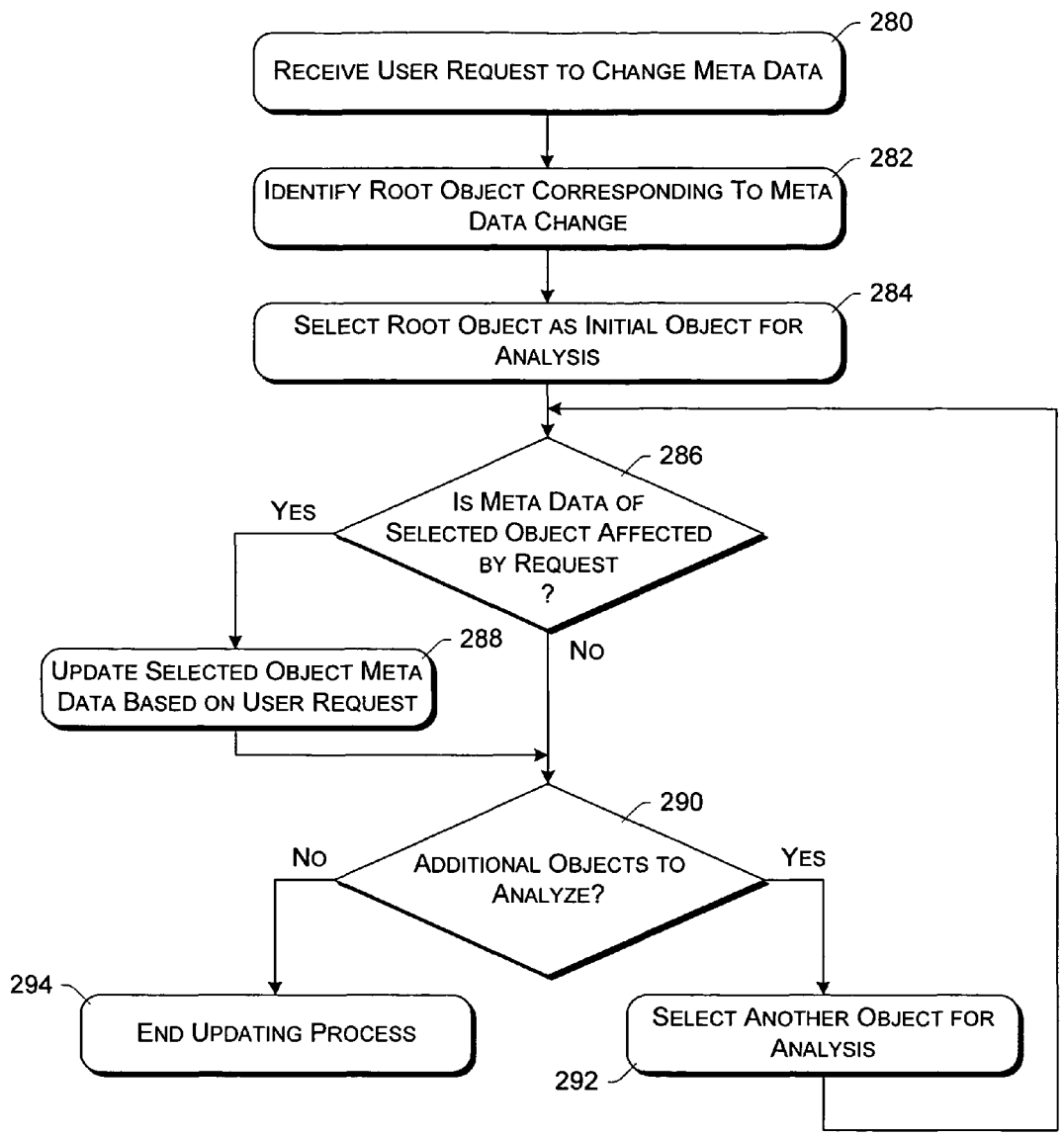
FIG. 6 is a flowchart illustrating an exemplary process for updating media content meta data.

FIG. 6 is a flowchart illustrating an exemplary process for updating media content meta data. The process of FIG. 6 is carried out by meta data manager 124 of FIG. 1, and may be implemented in software.

Initially, a user request to change the meta data is received (act 280), which includes an indication of the change the user would like to make (for example, what new data the user would like to add). The root object corresponding to the meta data change is then identified (act 282), and selected as the initial object for analysis (act 284). A determination is then made as to whether the selected object is affected by the request (act 286). An object is affect by the request if the object has meta data associated with it that corresponds to the user's request. For example, the root disc object may have been affected if the user requests to change the artist name of a CD, but not if the user requests to change the title of a track on the CD.

If the selected object is affected by the request, then the meta data associated with the selected object is updated based on the request (act 288). In one implementation, this updating comprises overwriting previous meta data with the meta data received as part of the user request. A check is then made as to whether any additional objects are to be analyzed (act 290). In one implementation, file manager 124 analyzes every object in the tree to determine whether it is affected by the request. If there are one or more additional objects to analyze, then one of the additional objects is selected (act 292) and the process returns to act 286. However, if there are no more objects to analyze, then the updating process ends (act 294).

The following example illustrates the process of updating media content data of FIG. 6. Assume that a user changes the title for a song (track) on a CD that is represented by track object 154 of FIG. 2. Meta data manager 124 begins with disc object 150 and does not change any meta data associated with disc object 150. However, track object 154 is affected by the user's requested change, so the title meta data associated with track object 154 is changed to identify the new title. Similarly, each of local file objects 160 and 162 are affected by the user's requested change, so the title meta data associated with each of file objects 160 and 162 are changed to identify the new title.

Figure 7:
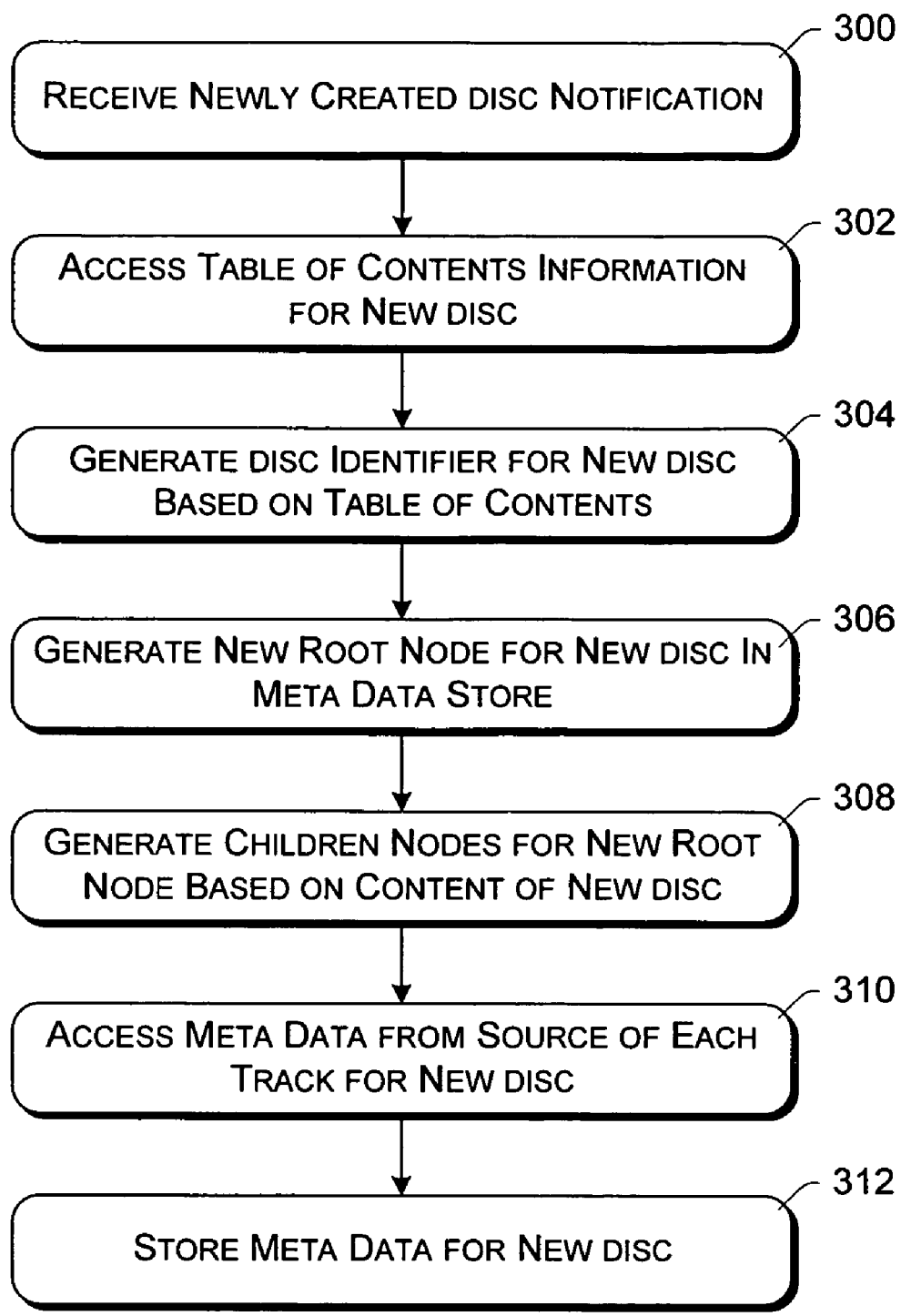
FIG. 7 is a flowchart illustrating an exemplary process for generating meta data for new media.

FIG. 7 is a flowchart illustrating an exemplary process for generating meta data for new media. The process of FIG. 7 is carried out by meta data manager 124 of FIG. 1, and may be implemented in software. The process of FIG. 7 is discussed with reference to a CD, although other types of media may alternatively be used.

Many commonly-available computer systems allow a user to generate his or her own media having whatever content he or she desires. For example, a device commonly referred to as a CDROM burner allows a user to create his or her own CDs with audio tracks of his or her choosing. This created CD can then be played in virtually any conventional CD drive. However, because the CD is a user-created CD, even though it may be created based on tracks from other publicly available CDs, its table of contents and thus its disc identifier will be different, and remote servers will not have meta data for the CD.

Meta data manager 124 solves this problem by communicating with the module that is managing the creation of the new CD (e.g., content player 122). The module managing creation of the new CD knows the identity of the tracks being stored on the new CD. Meta data manager 124 uses this track identification information to access the local meta data store and create new meta data. This process is illustrated in FIG. 7.

Initially, a notification of a newly created disc is received (act 300). The module managing creation of the new disc notifies meta data manager 124 that the new disc is being created. Once the new disc is created, meta data manager 124 accesses the table of contents information for the new disc (act 302). A disc identifier is then generated based on the table of contents information (act 304), analogous to act 244 of FIG. 5.

A new root node is then created for the new disc in the local meta data store (act 306). New children nodes are also created (act 308) based on the contents of the disc. For each child (track) node, the manager 124 accesses the meta data for the track stored in the database form the source of that track (act 310). In this situation, the source of the track refers to the track (or file) that the user identifies as being a track that should be stored on the new CD. This meta data is then stored for the new disc (act 312).

It should be noted that, when creating a new CD, the tracks stored on the new CD may optionally be associated with the source. In one implementation, this is accomplished by identifying each track on the new CD as a child of the original file or track. For example, if a user creates a new CD by copying a track from a previous CD X, then a new CD root node and track node for the new track are created as discussed above. Furthermore, the track for the new CD is identified in the database as a child of the track on CD X, so any subsequent changes to the meta data for that track on CD X are propagated to the meta data for the new track.

Figure 8:
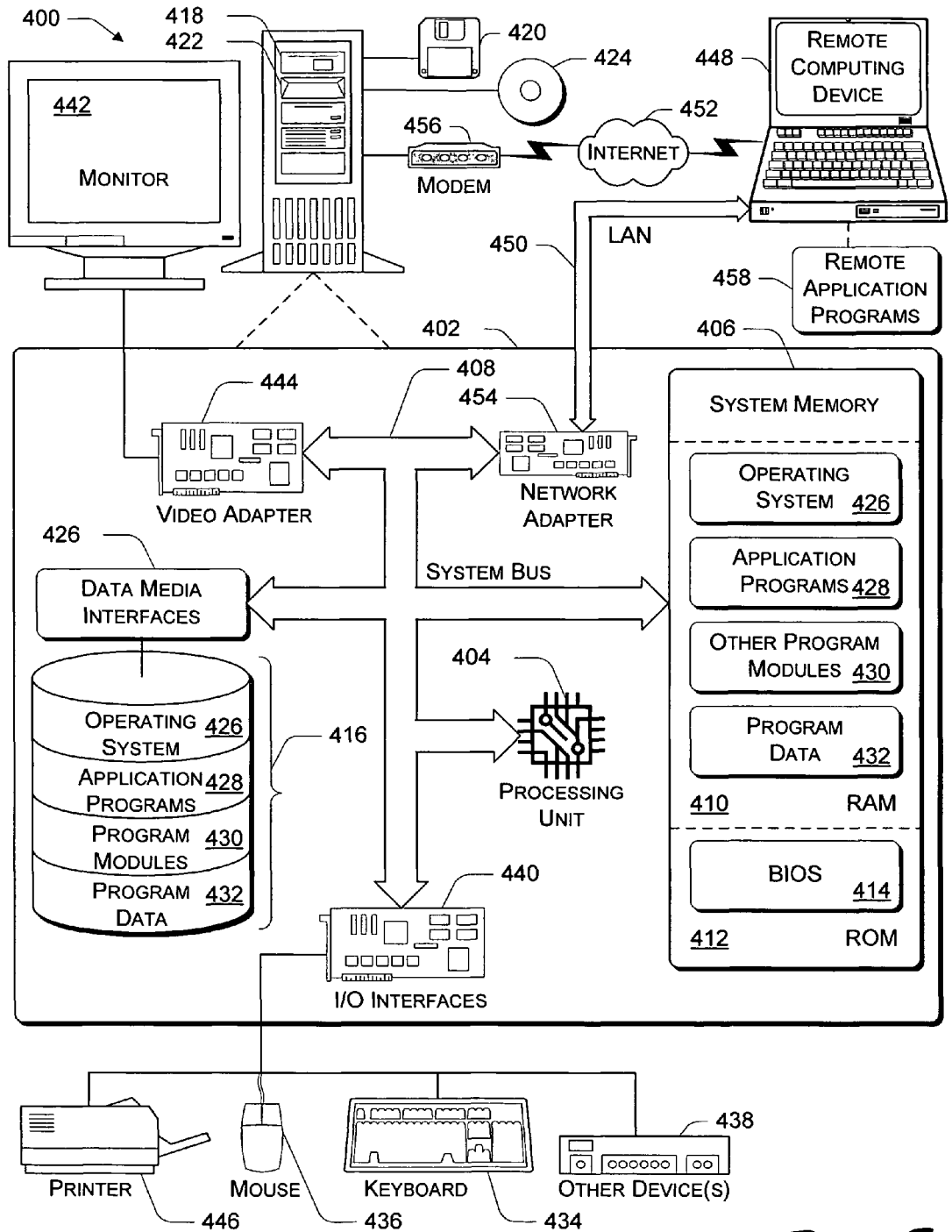
FIG. 8 illustrates a general exemplary computer environment which can be used to implement the improved meta data management.

FIG. 8 illustrates a more general exemplary computer environment 400, which can be used to implement the improved meta data management described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be, for example, any of computing devices 102, 104, or 106 of FIG. 1. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 8 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disc drive 422 for reading from and/or writing to a removable, non-volatile optical disc 424 such as a CD-ROM, DVD-ROM, or other optical media. The hard disk drive 416, magnetic disk drive 418, and optical disc drive 422 are each connected to the system bus 408 by one or more data media interfaces (not shown).

The various drives and their associated computer-readable media provide non-volatile storage of computer readable instructions, data structures, program modules, and other data for computer 402. Although the example illustrates a hard disk 416, a removable magnetic disk 420, and a removable optical disc 424, it is to be appreciated that other types of computer readable media which can store data that is accessible by a computer, such as magnetic cassettes or other magnetic storage devices, flash memory cards, CD-ROM, digital versatile discs (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disc 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 1448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Computer 402 typically includes at least some form of computer readable media. Computer readable media can be any available media that can be accessed by computer 402. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other media which can be used to store the desired information and which can be accessed by computer 402. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described herein in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. An apparatus comprising:
    a processor; and
    a memory coupled to the processor, the memory including computer-readable instructions configured to cause the processor to perform acts of:
        maintaining a first set of meta data associated with a first piece of content stored on a piece of media, the first piece of content associated with an identifier identifying the first piece of content as a parent node;
        maintaining a second set of meta data associated with a second piece of content, wherein the second piece of content is a ripped version of the first piece of content, wherein the ripped version constitutes a previously-copied version of the first piece of content; and
        altering the second set of meta data associated with the second piece of content in response to the first set of meta data associated with the first piece of content being altered, wherein said altering is performed using a data structure comprising:
            a first entry identifying a first object as a track object, wherein the first piece of content corresponds to the first object;
            a second entry identifying a second object as a ripped file object, wherein the second piece of content corresponds to the second object; and
            a third entry identifying a parent and child relationship between the first object and the second object, respectively.

2. An apparatus as recited in claim 1, wherein the first piece of content is a track of a compact disc (CD).

3. An apparatus as recited in claim 1, wherein the first set of meta data associated with the first piece of content is formed, at least in part, using a cyclic redundancy check.

4. An apparatus as recited in claim 1, wherein the second piece of content is stored on a local hard drive.

5. An apparatus as recited in claim 1, wherein said altering is performed using the data structure further comprising:
    a fourth entry identifying meta data that comprises the first set of meta data associated with the first object; and
    a fifth entry identifying meta data that comprises the second set of meta data associated with the second object.

6. An apparatus comprising:
    means for maintaining a first set of meta data associated with a first piece of content stored on a piece of media;
    means for maintaining a second set of meta data associated with a second piece of content, wherein the second piece of content is a ripped version of the first piece of content, wherein the ripped version constitutes a previously-copied version of the first piece of content;
    means for altering the second set of meta data associated with the second piece of content in response to the first set of meta data associated with the first piece of content being altered,
    wherein said means for altering includes a data structure that comprises:
        a first entry identifying a first object, wherein the first piece of content corresponds to the first object;
        a second entry identifying a second object, wherein the second piece of content corresponds to the second object; and
        a third entry identifying a parent and child relationship between the first object and the second object, respectively; and
    means for storing the altered first set of meta data and the altered second set of meta data as password-protected private meta data intended for a particular one or more users.

7. An apparatus as recited in claim 6, further comprising:
    means for receiving a first indication of a change to be made to the first set of meta data associated with a first piece of content on a piece of media;
    first means for changing, based on the first indication, the first set of meta data associated with the first piece of content;
    means for identifying a second piece of content wherein the second piece of content is a ripped version of the first piece of content; and
    second means for changing, based on the first indication, the second set of meta data associated with the second piece of content.

8. An apparatus as recited in claim 7, wherein the first piece of content comprises a song on a compact disc (CD).

9. An apparatus as recited in claim 7, wherein the means for receiving the first indication includes means for identifying new meta data, and wherein the first means for changing includes means for overwriting any previous meta data associated with the first piece of content with the new meta data.

10. An apparatus as recited in claim 7, wherein the first piece of content comprises an audio track, and wherein the second piece of content comprise a different version of the audio track.

11. An apparatus as recited in claim 7, wherein the first set of meta data associated with the first piece of content includes meta data received from a remote server, and wherein the change to be made to the first set of meta data associated with the first piece of content includes new meta data received from a user.

12. An apparatus as recited in claim 7, further comprising:
means for receiving a second indication, wherein the second indication includes a change to be made to the second set of meta data associated with the second piece of content;
third means for changing, based on the second indication, the second set of meta data associated with the second piece of content; and
fourth means for changing, based on the second indication, the first set of meta data associated with the first piece of content.

13. An apparatus as recited in claim 6, wherein the means for altering includes altering means configured to use a cyclic redundancy check of the second piece of content.

14. A system comprising:
a disc drive configured to have a removable disc inserted therein, wherein the removable disc includes a first piece of content;
local storage configured to store a second piece of content, wherein the second piece of content is a copied version of the first piece of content; and
a meta data management module configured to alter a second set of meta data associated with the second piece of content and a third set of metadata associated with the removable disc in response to a first set of meta data associated with the first piece of content being altered,
wherein said meta data management module is configured to access a data structure that comprises:
a first entry identifying a first object comprising a track object, wherein the first piece of content corresponds to the first object;
a second entry identifying a second object comprising a file object, wherein the second piece of content corresponds to the second object;
a third entry identifying a parent and child relationship between the first object and the second object, respectively;
a fourth entry identifying a disc object corresponding to the removable disc that originally contained the first piece of content; and
a fifth entry identifying a parent and child relationship between the disc object and the track object, the disc object being the root parent of the first and second entries.

15. A system as recited in claim 14, wherein the local storage is further configured to store both a first set of meta data associated with the first piece of content and a second set of meta data associated with the second piece of content.

16. An apparatus comprising:
means for storing a first entry identifying a first object in a memory, the means for storing including means for associating the first object with a first identifier;
means for storing a second entry identifying a second object in the memory the means for storing including means for associating the second object with a second identifier, the second identifier being a different identifier than the first identifier;
means for forming a third entry identifying a parent and child relationship between the first object and the second object, the third entry using the first identifier and the second identifier, respectively, to reference the first object and the second object, wherein the second object is a copy of the first object;
means for creating a fourth entry identifying meta data that comprises a first set of meta data associated with the first object;
means for creating a fifth entry identifying meta data that comprises a second set of meta data associated with the second object; and
means for altering the meta data that comprises a second set of meta data associated the second object in response to the meta data that comprises a first set of meta data associated with the first object being altered.

17. An apparatus as recited in claim 16, wherein each entry is implemented in a different table in a database.

18. An apparatus as recited in claim 16, wherein the means for forming includes means for identifying the relationship between the first object and the second object based, at least in part, on the first identifier and the second identifier.

* * * * *